United States Patent
Kim et al.

(10) Patent No.: US 10,321,473 B2
(45) Date of Patent: Jun. 11, 2019

(54) METHOD OF TRANSMITTING OR RECEIVING FRAME IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/791,157

(22) Filed: Oct. 23, 2017

(65) Prior Publication Data

US 2018/0124806 A1    May 3, 2018

Related U.S. Application Data

(60) Provisional application No. 62/411,697, filed on Oct. 24, 2016, provisional application No. 62/415,519, filed on Nov. 1, 2016.

(51) Int. Cl.
| | |
|---|---|
| *H04W 4/00* | (2018.01) |
| *H04W 72/12* | (2009.01) |
| *H04W 72/04* | (2009.01) |
| *H04W 74/08* | (2009.01) |
| *H04W 84/12* | (2009.01) |

(52) U.S. Cl.
CPC ... *H04W 72/1205* (2013.01); *H04W 72/0446* (2013.01); *H04W 72/1278* (2013.01); *H04W 74/0816* (2013.01); *H04W 84/12* (2013.01)

(58) Field of Classification Search
CPC ......... H04W 72/1205; H04W 74/0816; H04W 72/0446; H04W 72/1278; H04W 84/12
USPC ........................................... 370/329; 455/411
See application file for complete search history.

(56) References Cited

U.S. PATENT DOCUMENTS

2017/0013470 A1*    1/2017    Sun ..................... H04W 16/14

OTHER PUBLICATIONS

European Patent Office Application Serial No. 17189212.8, Search Report dated Feb. 22, 2018, 11 pages.
Huang, P. et al., "Setting for TXOP Duration Field", doc.: IEEE 802.11-16/0951r0, Jul. 2016, 20 pages.

(Continued)

*Primary Examiner* — Marcos Batista
(74) *Attorney, Agent, or Firm* — Lee, Hong, Degerman, Kang & Waimey

(57) ABSTRACT

According to one embodiment of the present invention, a method for a station (STA) to transmit a frame in a wireless local area network system includes setting a TXOP duration field and a UL flag and transmitting a high efficiency physical layer protocol data unit (HE PPDU) including the TXOP duration field and the UL flag. In this case, the STA sets the UL flag to a first value corresponding to uplink if the HE PPDU is addressed to an access point (AP). When the TXOP duration field is set to a special value other than a TXOP duration value for configuring a network allocation vector and the HE PPDU corresponds to a single user PPDU carrying an ready-to-send frame or a clear-to-send frame, the STA may set the UL flag to a second value corresponding to downlink, even if the HE PPDU is addressed to the AP.

15 Claims, 20 Drawing Sheets

(56) References Cited

OTHER PUBLICATIONS

Seok, Y. et al., "Comment Resolution on Subclause 25.11", doc.: IEEE 802.11-1610862r1, Jul. 2016, 6 pages.
Zhang, J. et al., "HE-SIGA content", doc.: IEEE 802.11-15/1077r0, Sep. 2015, 22 pages.
Asterjadhi, A. et al., "Identifiers in HE PPDUs for power saving", doc.: IEEE 802.11-15/1122r0, Sep. 2015, 18 pages.
Asterjadhi, A. et al., "Comment resolutions for intra-PPDU power save", doc.: IEEE 802.11-16/0844r2, Jul. 2016, 4 pages.

* cited by examiner

FIG. 13

| 8µs | 8µs | 4µs | 4µs | 8µs | 4µs per symbol | 4µs | Variable durations per HE-LTF symbol | | |
|---|---|---|---|---|---|---|---|---|---|
| L-STF | L-LTF | L-SIG | RL-SIG | HE-SIG-A | HE-SIG-B | HE-STF | HE-LTF ... HE-LTF | Data | PE |

HE MU PPDU format

HE extended range SU PPDU format

METHOD OF TRANSMITTING OR RECEIVING FRAME IN WIRELESS LAN SYSTEM AND APPARATUS THEREFOR

CROSS-REFERENCE TO RELATED APPLICATIONS

Pursuant to 35 U.S.C. § 119(e), this application claims the benefit of U.S. Provisional Patent Application No(s). 62/411,697, filed on Oct. 24, 2016 and 62/415,519, filed on Nov. 1, 2016, the contents of which are all hereby incorporated by reference herein in their entirety.

TECHNICAL FIELD

The present invention relates to a method of transmitting or receiving a frame in a wireless LAN system, and more particularly, to a method of transmitting or receiving a PPDU carrying an RTS/CTS frame and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

A technical task of the present invention is to provide a method of transmitting or receiving a HE PPDU carrying an RTS/CTS frame in consideration of a power saving mechanism of a $3^{rd}$ party STA and an apparatus therefor.

The present invention is not limited to the above technical problems and other technical objects may be inferred from embodiments of the present invention.

Technical Solution

In an aspect of the present invention to achieve the technical object, a method of transmitting a frame by a station (STA) in a wireless local area network (WLAN) system, includes setting a transmission opportunity (TXOP) duration field and a uplink (UL) flag, and transmitting a high efficiency physical layer protocol data unit (HE PPDU) including the TXOP duration field and the UL flag. In this case, the STA sets the UL flag to a first value corresponding to uplink if the HE PPDU is addressed to an access point (AP). When the TXOP duration field is set to a special (i.e. predetermined) value other than a TXOP duration value for setting a network allocation vector (NAV) and the HE PPDU corresponds to a single user (SU) PPDU carrying an ready-to-send (RTS) frame or a clear-to-send (CTS) frame, the STA may set the UL flag to a second value corresponding to downlink even if the HE PPDU is addressed to the AP.

In another aspect of the present invention, to achieve the technical object, a station (STA) transmitting a frame in a wireless local area network (WLAN) system includes a processor configured to set a transmission opportunity (TXOP) duration field and a uplink (UL) flag, and a transmitter configured to transmit a high efficiency physical layer protocol data unit (HE PPDU) including the TXOP duration field and the UL flag under the control of the processor. In this case, the processor is configured to set the UL flag to a first value corresponding to uplink if the HE PPDU is addressed to an access point (AP). When the TXOP duration field is set to a special (i.e. predetermined) value other than a TXOP duration value for setting a network allocation vector (NAV) and the HE PPDU corresponds to a single user (SU) PPDU carrying a ready-to-send (RTS) frame or a clear-to-send (CTS) frame, the processor is configured to set the UL flag to a second value corresponding to downlink even if the HE PPDU is transmitted to the AP.

If the SU PPDU carrying the RTS frame or the CTS frame corresponds to a HE extended range (ER) SU PPDU, the STA may set the UL flag to the second value.

The HE ER SU PPDU may be an SU PPDU in which a HE-SIG A field including the TXOP duration field and the UL flag is repeated more than one time.

If the SU PPDU carrying the RTS frame or the CTS frame is not the HE ER SU PPDU, the STA may set the UL flag to the first value.

The special value may correspond to a value for setting each bit (i.e. all bits) of the TXOP duration field to 1 s.

If the HE PPDU carries the RTS frame or the CTS frame, the STA may set each bit of the TXOP duration field to 1 s.

When a PPDU received by the STA solicits for transmission of the HE PPDU, and each bit of a TXOP duration field of the received PPDU is set to 1 s, the STA may set each bit of the TXOP duration field of the HE PPDU to 1 s.

If the STA sets the UL flag of the HE PPDU addressed to the AP to the second value, a $3^{rd}$ party STA operating in an intra-PPDU power saving mode may not enter a doze state until the end of the HE PPDU.

Advantageous Effects

According to embodiments of the present invention, it is possible to prevent a $3^{rd}$ party STA from entering intra-PPDU PS mode for a HE PPDU carrying an RTS/CTS frame by using a transmission opportunity (TXOP) duration and a UL flag included in a signaling field.

Other technical effects in addition to the above-described effects may be inferred from embodiments of the present invention.

DESCRIPTION OF DRAWINGS

FIGS. 12 to 15 illustrate HE PPDUs;

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
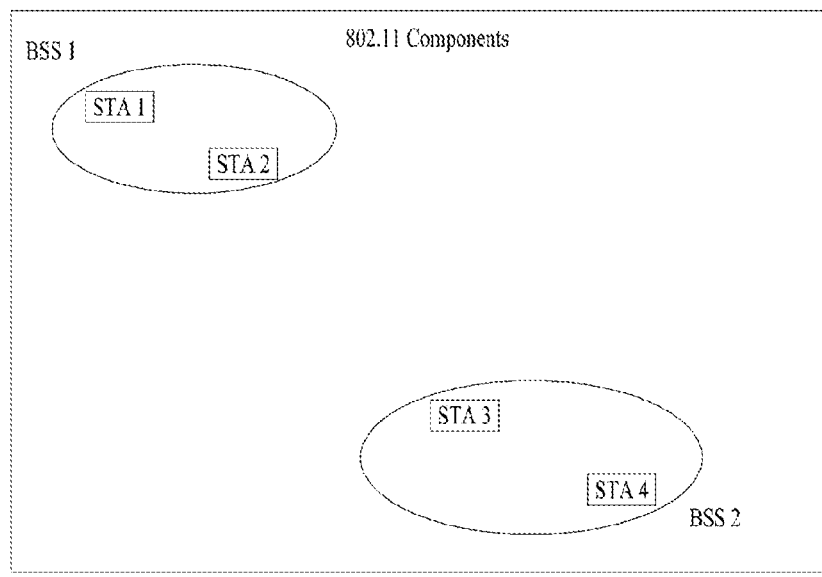
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
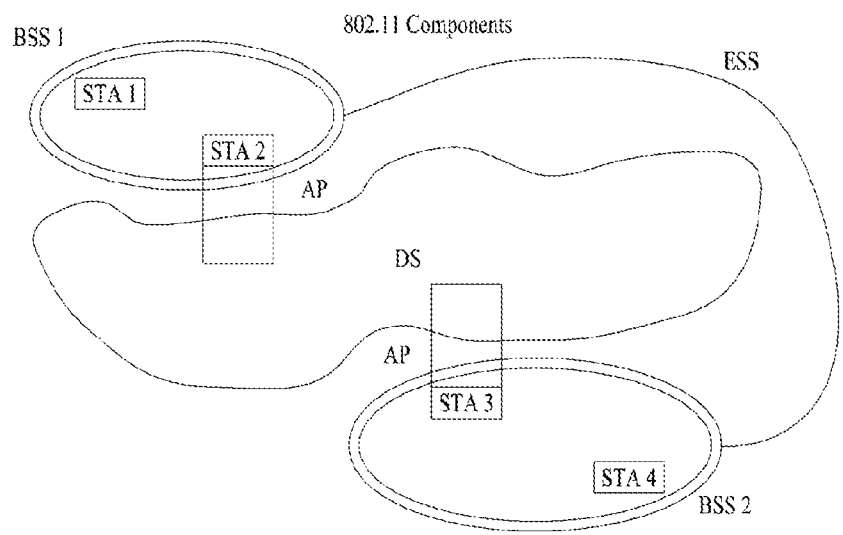
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
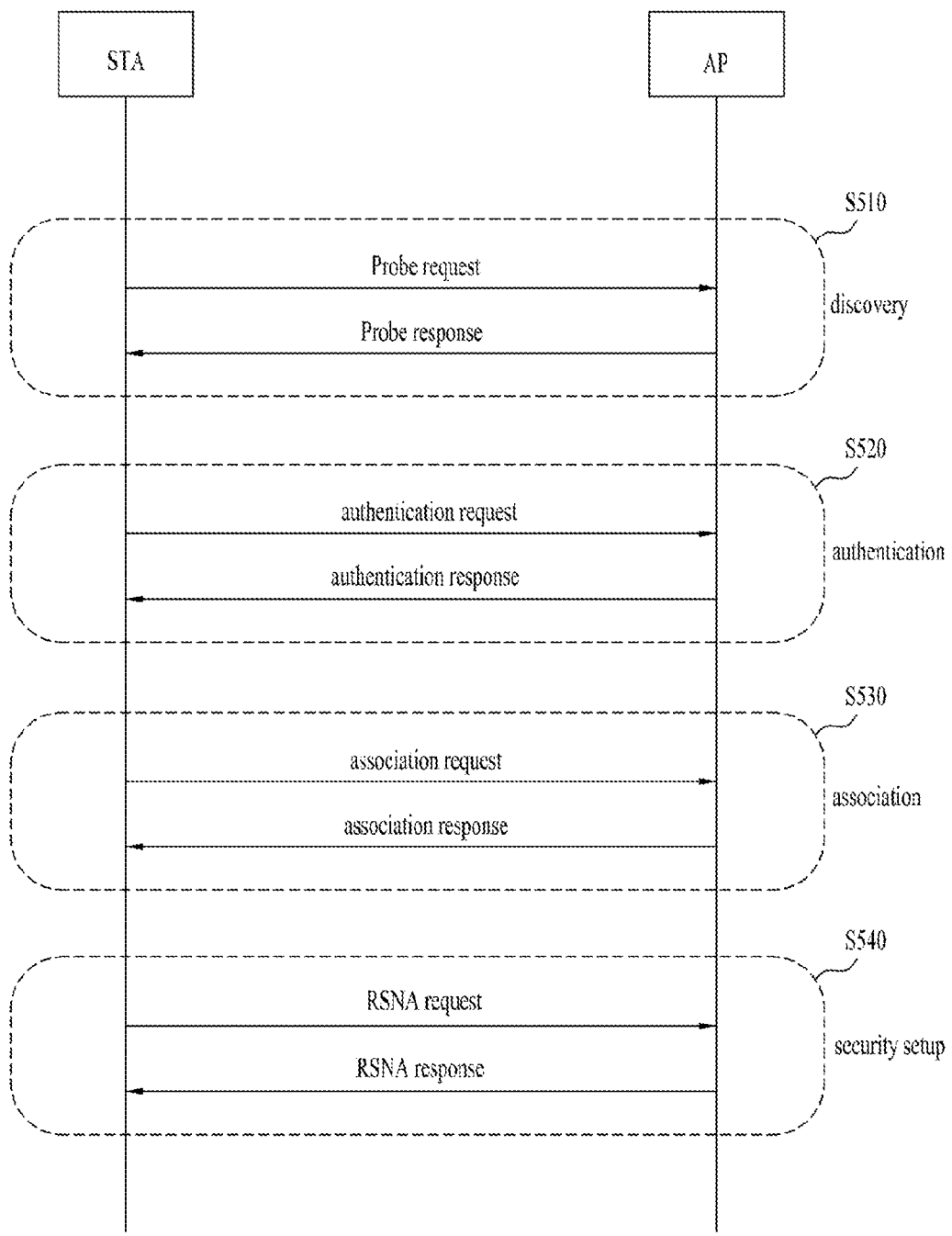
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA may have to perform such link setup through processes of network discovery, authentication, and association, and may have to establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA may have to search for an available network so as to access the network. The STA may have to identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
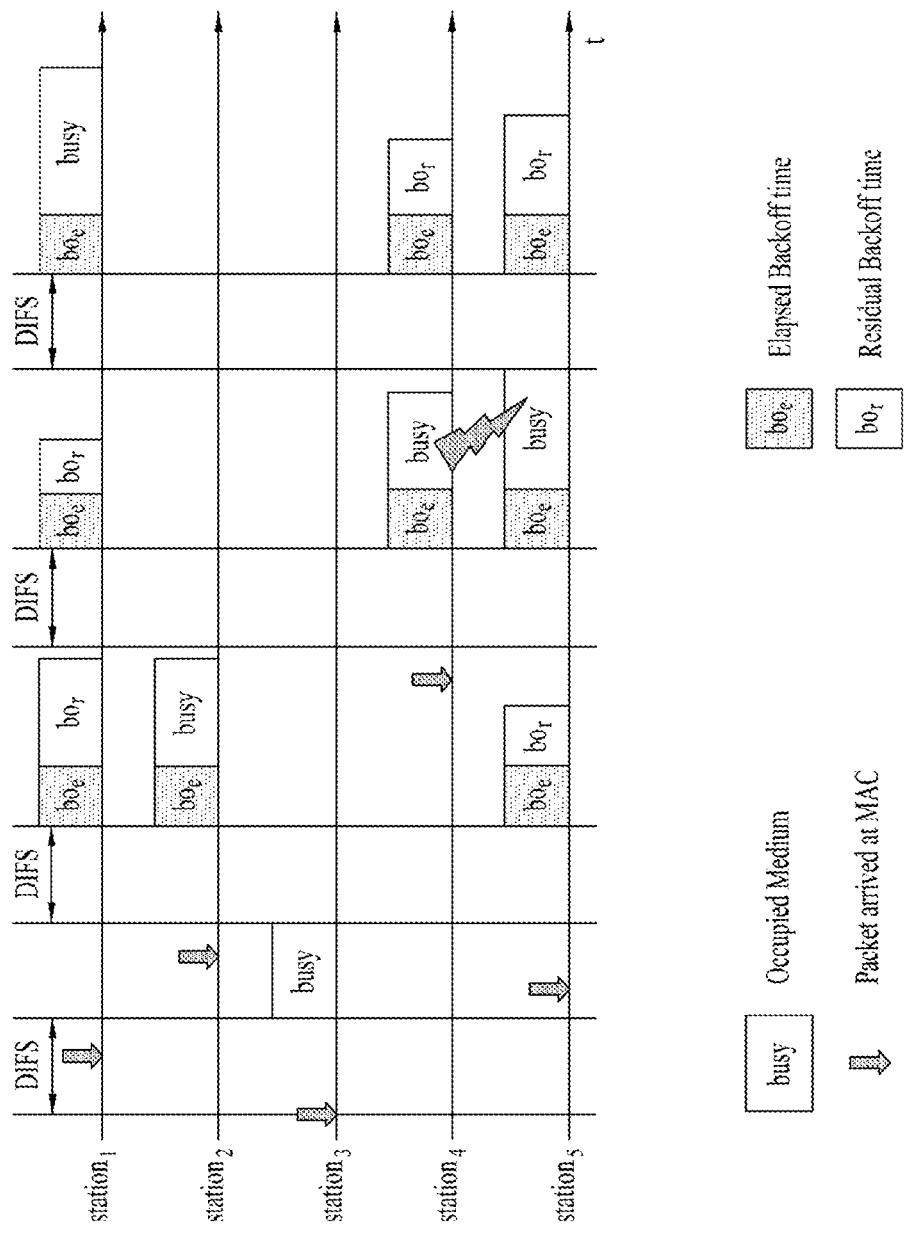
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
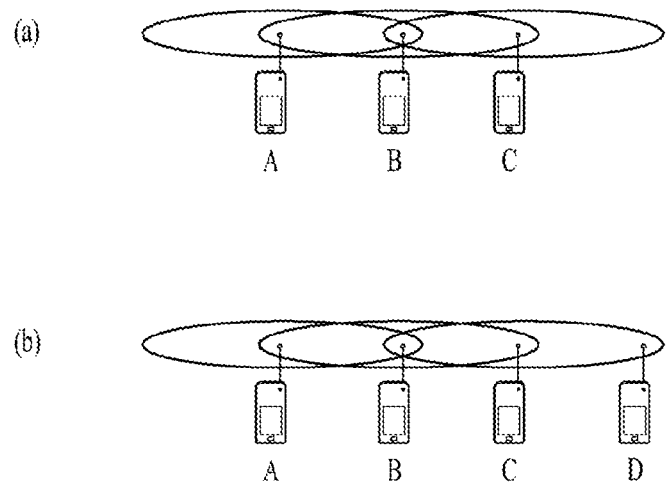
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C may have to wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
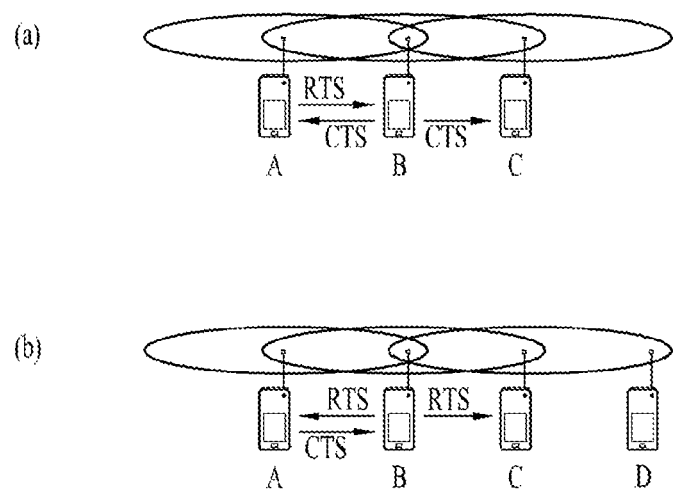
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C may have to wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system may have to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements may include a TIM used to indicate a unicast frame and a delivery traffic indication map (DTIM) used to indicate a multicast or broadcast frame.

Figure 7:
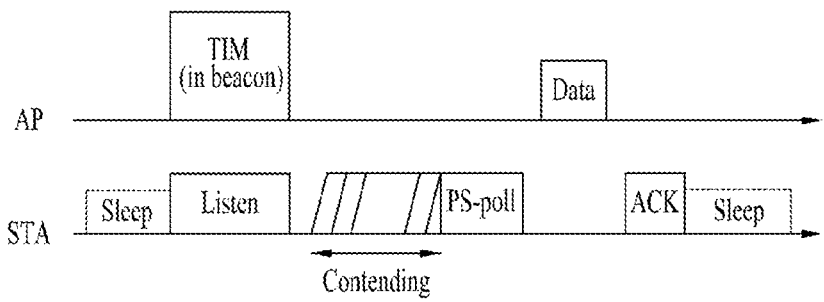
FIGS. 7 to 9 are explanatory diagrams of operation of an STA that has received TIM.
Figure 8:
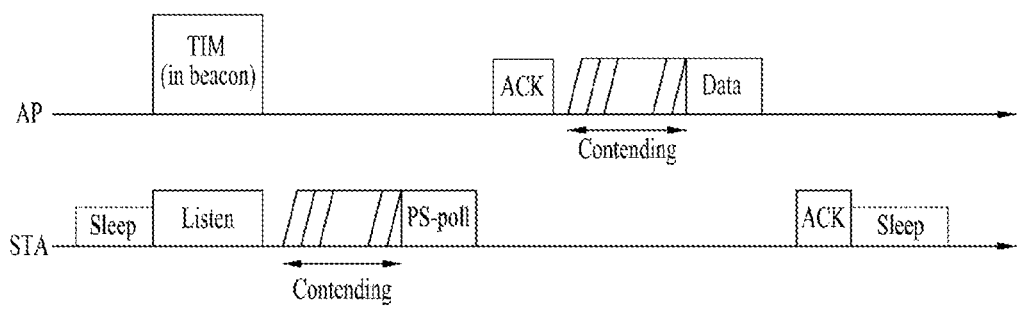
Figure 9:
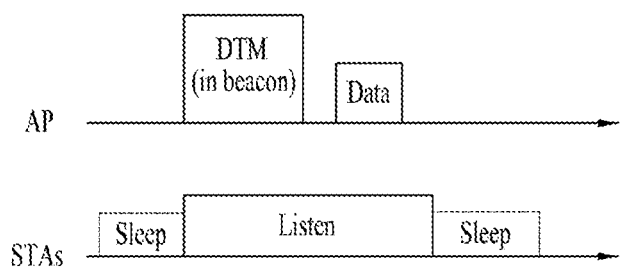

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
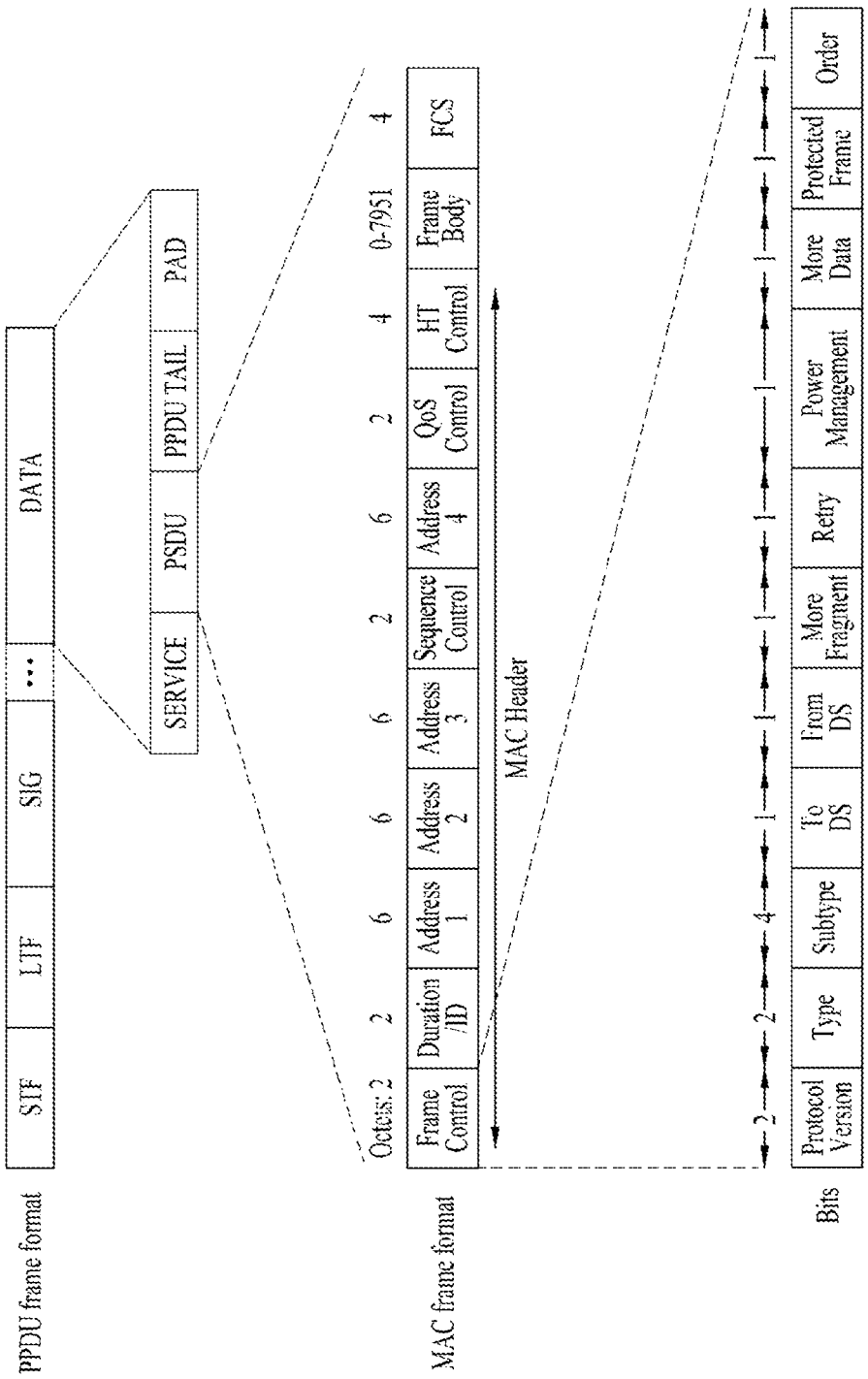
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), am LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
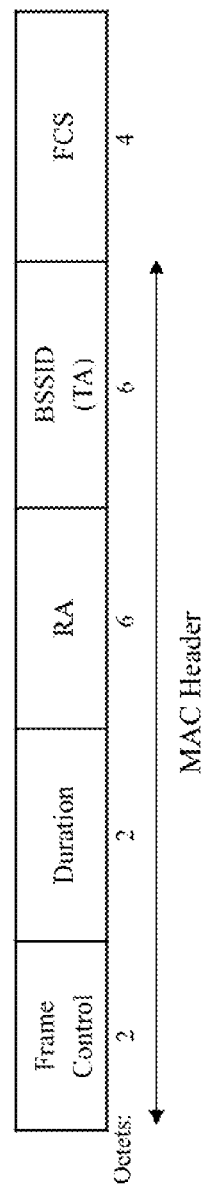
FIG. 11 illustrates a contention free (CF)-END frame.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Examples of HE PPDU Structure

In the following, examples of a high efficiency physical layer protocol data unit (HE PPDU) in a wireless LAN system supporting 11ax are explained.

FIGS. 12 to 15 illustrate HE PPDUs.

A HE-SIG A field is positioned after L-part (L-STF, L-LTF, L-SIG). Similar to the L-part, the HE-SIG A field is repeated (duplicated) in a unit of 20 MHz. The HE-SIG1 A can be included in all HE PPDUs. On the contrary, HE SIG B can be omitted from an SU PPDU or a UL trigger-based PPDU (e.g., a UL PPDU transmitted based on a trigger frame).

The HE-SIG A includes common control information (e.g., BW, GI length, BSS color, CRC, Tail, etc.) on STAs. The HE-SIG A field includes information for interpreting HE PPDU. Hence, information included in the HE-SIG A field may vary depending on a format of HE PPDU (e.g., SU PPDU, MU PPDU, or trigger-based PPDU).

For example, (i) in case of the HE SU PPDU format, the HE-SIG A field can include at least one selected from the group consisting of a DL/DL indicator, a HE PPDU format indicator, BSS color, TXOP duration, BW (bandwidth), MCS, CP+LTF length, coding information, number of streams, STBC (e.g., whether or not STBC is used), transmission beamforming (TxBF) information, CRC, and Tail. In case of the HE SU PPDU format, HE-SIG B field can be omitted. (ii) In case of the HE MU PPDU format, the HE-SIG A field can include at least one selected from the group consisting of a DL/UL indicator, BSS color, TCOP duration, BW (bandwidth), MCS information of SIG B field, number of symbols of the SIG B field, HE LTF symbol number, an indicator indicating whether or not full band MU-MIMO is used, CP+LTF length, transmission beamforming (TxBF) information, CRC, and Tail. (iii) In case of HE trigger-based PPDU format, the HE-SIG A field can include at least one selected from the group consisting of a format indicator (e.g., indicating SU PPDU or trigger-based PPDU), BSS color, TXOP duration, BW, CRC, and Tail.

The HE SIG-A includes not only the common control information but also user allocation information (e.g., at least one selected from the group consisting of an STA identifier such as PAID, GID, and the like, information on allocated resource, and number of streams (Nsts)).

Meanwhile, for clarity, the DL/UL indicator can be referred to as a UL flag. Specifically, the DL/UL indicator may correspond to a name of a subfield included in the HE-SIG A field. A transmitting end sets the DL/UL indicator included in the HE-SIG A field using a TXVECTOR parameter UL FLAG corresponding to a physical layer parameter. For example, if the TXVECTOR parameter UL FLAG corresponds to a value (e.g., 0) corresponding to DL, an STA/AP of a transmitting side sets the DL/UL indicator as the value (e.g., 0) corresponding to DL. If the TXVECTOR parameter UL FLAG corresponds to a value (e.g., 1) corresponding to UL, the STA/AP of the transmitting side sets the DL/UL indicator as the value (e.g., 1) corresponding to UL. Meanwhile, an STA of a receiving side receives the DL/UL indicator included in the HE-SIG A field and sets an RXVECTOR parameter UL FLAG based on the DL/UL indicator. If the DL/UL indicator included in a received frame corresponds to a value (e.g., 0) corresponding to DL, an STA/AP of the receiving side sets the RXVECTOR parameter UL FLAG as the value (e.g., 0) corresponding to DL. If the DL/UL indicator included in the received frame corresponds to a value (e.g., 1) corresponding to UL, the STA/AP of the receiving side sets the RXVECTOR parameter UL FLAG as the value (e.g., 1) corresponding to UL.

Similar to the TXVECTOR parameter UL FLAG or the RXVECTOR parameter UL FLAG, TX or RXVECTOR parameter BSS color and TXOP duration exist in the BSS color and the TXOP duration of the HE-SIG A field.

Figure 12:
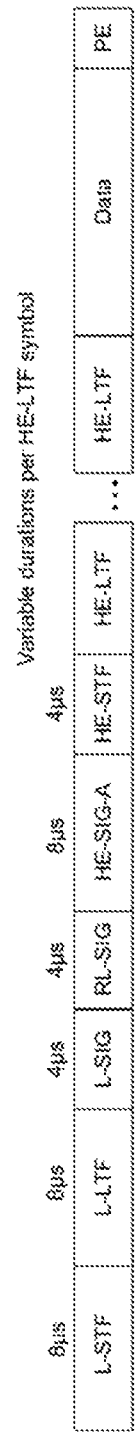
Figure 14:
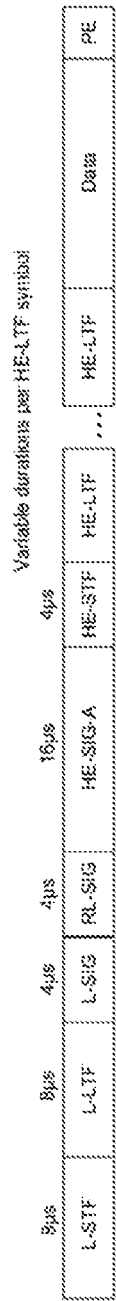
Figure 15:
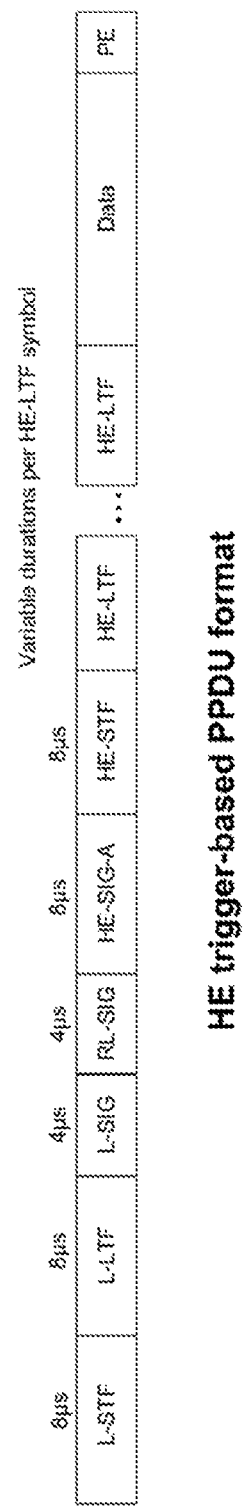

Although FIG. 12 and FIG. 14 show SU formats, the SU formats have a difference in a length of the HE-SIG A field. The HE SU PPDU shown in FIG. 12 has a length of 8 us. On the contrary, referring to HE extended range (ER) SU PPDU shown in FIG. 14, the HE-SIG A field has a length of 16 us. In particular, it is possible to comprehend it as the HE-SIG A field is repeated in the HE ER SU PPDU.

The BSS color information included in the HE-SIG A field corresponds to information for identifying BSS and has a length shorter than a length of a BSSID. For example, a BSSID has a length of 48 bits, whereas the BSS color information may have a length of 6 bits. An STA can determine whether or not a frame corresponds to an intra-BSS frame using the BSS color information. In particular, if the HE-SIG A field is decoded only, the STA can distinguish an intra BSS PPDU from an inter BSS PPDU via the BSS color information without decoding the whole of HE PPDU.

The HE-SIG B can be independently encoded in every 20 MHz channel unit. If the HE-SIG B is encoded in every 20 MHz channel unit, the HE-SIG B can be referred to as a HE-SIG B content channel.

According to one embodiment, if a bandwidth is not wider than 20 MHz, it may be possible to transmit a single HE-SIG B content channel. If a bandwidth is wider than 20 MHz, channels of a size of 20 MHz may transmit either a first HE-SIG B content channel (hereinafter, HE-SIG B [1]) or a second HE-SIG B content channel (hereinafter, HE-SIG B [2]). For example, the HE-SIG B [1] and the HE-SIG B [2] can be transmitted in turn. An odd-numbered 20 MHz channel transmits the HE-SIG B [1] and an even-numbered 20 MHz channel transmits the HE-SIG B [2]. More specifically, in case of a 40 MHz bandwidth, the HE-SIG B [1] is transmitted on a first 20 MHz channel and the HE-SIG B [2] is transmitted on a second 20 MHz channel. In case of an 80 MHz bandwidth, the HE-SIG B [1] is transmitted on a first 20 MHz channel, the HE-SIG B [2] is transmitted on a second 20 MHz channel, the identical HE-SIG B [1] is repeatedly transmitted on a third 20 MHz channel, and the identical HE-SIG B [2] is repeatedly transmitted on a fourth 20 MHz channel. The HE-SIG B [1] and the HE-SIG B [2] are similarly transmitted on a 160 MHz bandwidth.

Meanwhile, content of the HE-SIG B [1] may differ from content of the HE-SIG B [2]. Yet, all of the HE-SIG B [1] have the same content. Similarly, all of the HE-SIG B [2] have the same content.

The HE-SIG B can include a common field and a user specific field. The common field may appear prior to the user specific field. The common field and the user specific field can be distinguished from each other in a bit unit rather than an OFDM symbol unit.

The common field of the HE-SIG B includes information on all STAs configured to receive PPDU on a corresponding bandwidth. The common field can include RU (resource unit) allocation information. For example, when four 20 MHz-channels constructing 80 MHz are respectively designated as [LL, LR, RL, RR], a common block for LL and RL is included in the common field of the HE-SIG B [1] and a common block for LR and RR can be included in the common field of the HE-SIG B [2].

The user specific field of the HE-SIG B can include a plurality of user fields. Each of a plurality of the user fields can include information on a specific STA configured to receive PPDU. For example, a user field can include at least one selected from the group consisting of a station ID, MCS per STA, stream number 9 Nsts), coding (e.g., LDPC use indication), a DCM indicator, and transmission beamforming information, by which embodiments of the present invention may be non-limited.

UL MU Transmission

Figure 16:
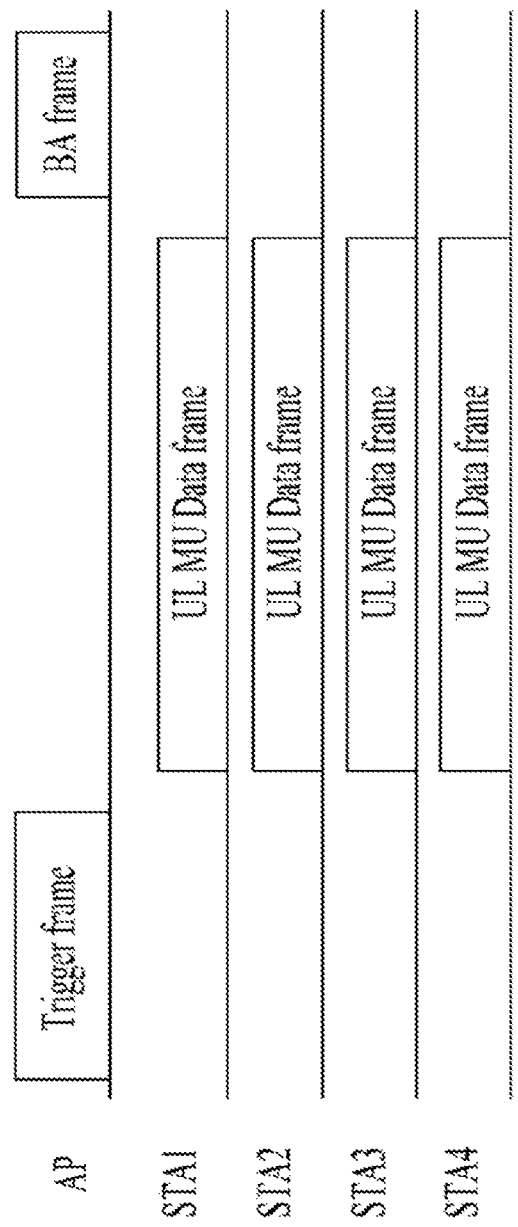
FIG. 16 is a diagram for explaining an uplink multi-user transmission situation.

FIG. 16 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 16. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 16, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 17:
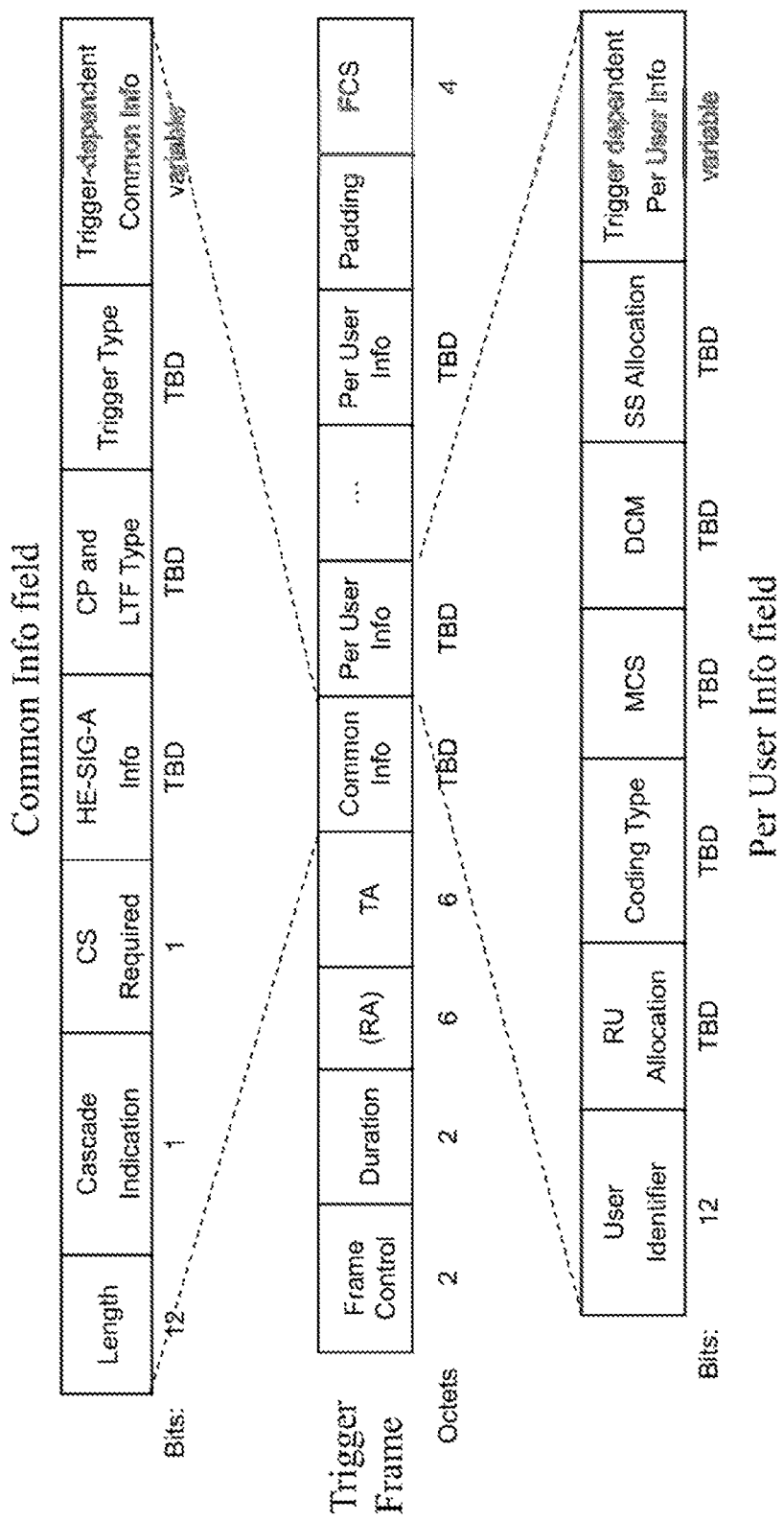
FIG. 17 illustrates an example of a trigger frame format.

FIG. 17 illustrates a trigger frame format according to an embodiment.

Referring to FIG. 17, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

HT Control Field

A MAC header includes a HT control field. The HT control field can be configured by various formats. For example, the HT control field can be configured by one selected from the group consisting of HT variant, VHT variant, and HE variant. The configuration of the HT control field configured for each format is shown in Table 1.

TABLE 1

| Variant | Bit 0 (value) | Bit 1 (value) | Bit 2-29 | Bit 30 | Bit 31 |
| --- | --- | --- | --- | --- | --- |
| HT variant | VHT (0) | | HT Control Middle | AC Constraint | RDG/More PPDU |
| VHT variant | VHT (1) | HE (0) | VHT Control Middle | AC Constraint | RDG/More PPDU |
| HE variant | VHT (1) | HE (1) | Aggregated Control | | |

A VHT Control Middle subfield included in a VHT Variant HT Control field can include MRQ, MSI/STBC, MFSI/GID-L, MFB, GID-H, Coding Type, FB Tx Type, and Unsolicited MFB.

An Aggregated Control subfield included in a HE Variant HT Control field can include a plurality of control subfields and a padding bit. Each of a plurality of the control subfields includes a control ID of 4 bits and control information. The control ID indicates a type of information included in the control information and a length of the control information.

If the control ID is set to 0, it indicates UL MU response scheduling. If the control ID is set to 0, the control information includes scheduling information for a HE trigger-based PPDU that carries an immediate acknowledgement. In this case, the immediate acknowledgement can be transmitted in response to a soliciting A=MPDU. And, the control information can include a UL PPDU length and RU allocation information.

If the control ID is set to 1, it indicates receive operation mode indication. In this case, the control information includes control information on a receive operation mode of an STA transmitting a frame including corresponding information. The control information can include the maximum number of spatial streams capable of being received by an STA and information on an operation bandwidth supported by the STA.

If the control ID is set to 2, it indicates HE link adaptation. In this case, the control information can include the number of preferred spatial streams for the link adaptation and information on an MCS index.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 18:
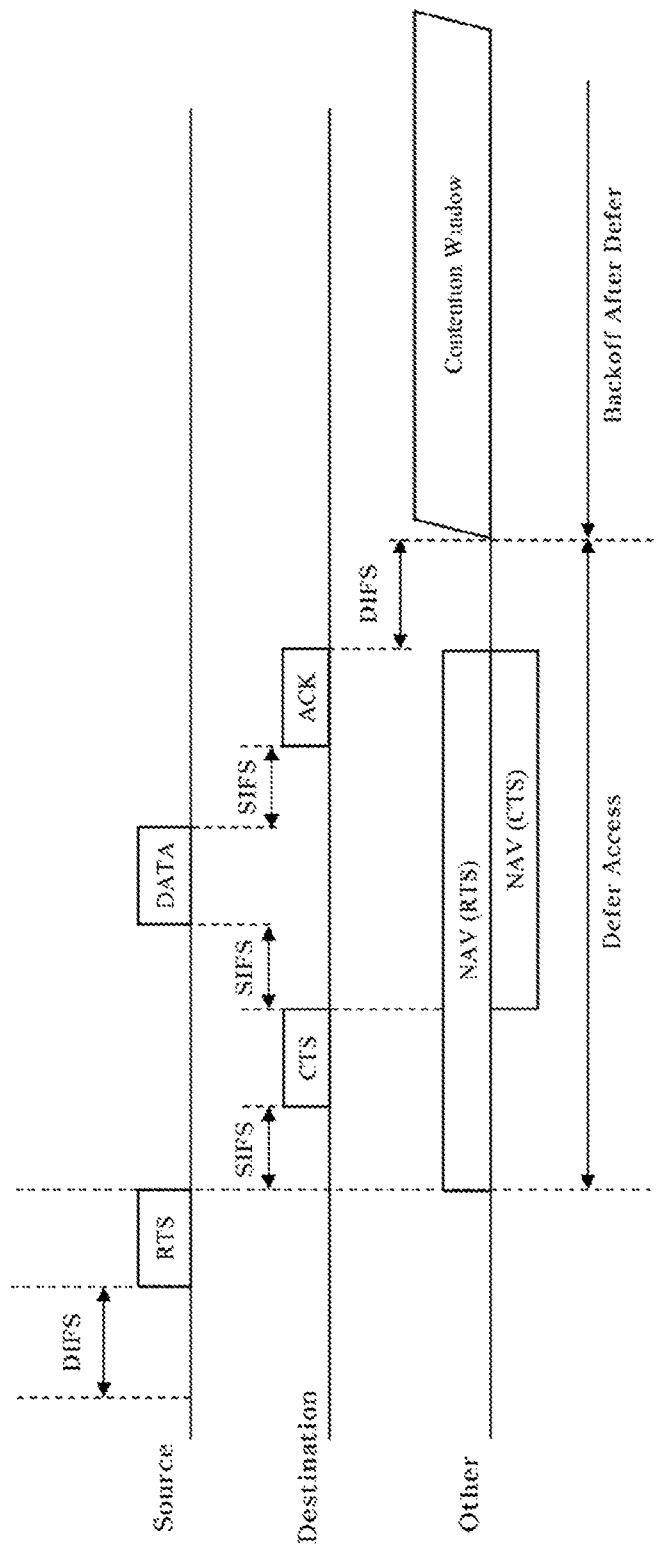
FIG. 18 illustrates an example of NAV setting.

FIG. 18 illustrates an example of NAV setting.

Referring to FIG. 18, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND-.indication primitive for which MAC corresponds to the RTS frame is received), STAs which have set or updated NAVs through the RTS frame can reset the NAVs (e.g., 0). The predetermined period may be (2*aSIFSTime+CTS_Time+aRxPHYStartDelay+2*aSlotTime). The CTS_Time may be calculated on the basis of the CTS frame length indicated by the RTS frame and a data rate.

Although FIG. 18 illustrates setting or update of a NAV through the RTS frame or CTS frame for convenience, NAV setting/resetting/update may be performed on the basis of duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

Figure 19:
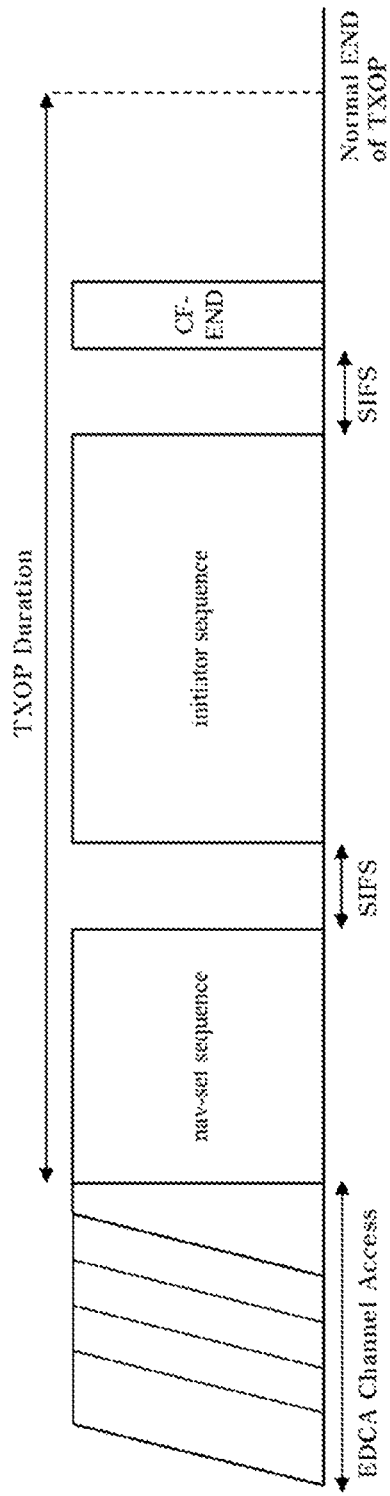
FIG. 19 illustrates an example of TXOP truncation.

FIG. 19 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 19, an STA that has accessed a medium transmits a sequence (e.g., RTS/CTS) for NAV setting.

After SIFS, a TXOP holder (or TXOP initiator) and a TXOP responder transmit and receive PPDUs (e.g., initiator sequence). The TXOP holder truncates a TXOP by transmitting a CF-END frame when there is no data to be transmitted within the TXOP.

STAs which have received the CF-END frame reset NAYS thereof and can start contending for medium access without delay.

As described above, a TXOP duration may be set through the duration field of the MAC header in the current wireless LAN system. That is, a TXOP holder (e.g., Tx STA) and a TXOP responder (e.g., Rx STA) may include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and sets/updates NAVs to defer use of channels until NAV periods.

In an 11ax system supporting the HE PPDU, the third party STAs cannot decode an MPDU included in a UL MU PPDU even when they receive the UL MU PPDU if the UL MU PPDU does not include the HE-SIG B. If the third party STAs cannot decode the MPDU, the third party STAs cannot acquire TXOP duration information (e.g., duration field) included in the MAC header of the MPDU. Accordingly, it is difficult to correctly perform NAV setting/update.

Even when an HE PPDU frame including the HE-SIG B is received, if the HE-SIG B structure is encoded per STA and is designed such that a STA can read only HE-SIG B content allocated to that STA, the third party STAs cannot decode a MAC frame (e.g., an MPDU in the HE PPDU corresponding to other STAS) transmitted and received by other STAs. Accordingly, the third party STAs cannot acquire TXOP information in this case.

TXOP Duration Via HE-SIG A

In an 11ax system supporting HE PPDU, if UL MU PPDU does not include HE-SIG B, although $3^{rd}$ STAs receive the UL MU PPDU, the $3^{rd}$ STAs are unable to decode MPDU included in the UL MU PPDU. If the $3^{rd}$ STAs are unable to decode the MPDU, the $3^{rd}$ STAs are unable to obtain TXOP duration information (e.g., Duration field) included in an MAC header of the MPDU. Hence, it is difficult to properly perform NAV configuration/update.

Although HE PPDU frame including the HE-SIG B is received, if a structure of the HE-SIG B is differently coded according to an STA and the structure of the HE-SIG B is designed to make an STA read HE-SIG B content assigned to the STA only, the $3^{rd}$ STAs are unable to decode a MAC frame (e.g., MPDU of a different STA included in the HE PPDU) transmitted/received by different STAs. Hence, the 3$^{rd}$ STAs are unable to obtain the TXOP information.

In order to solve the abovementioned problems, embodiments of the present invention provide a method for an STA to transmit the TXOP duration information in a manner of including the TXOP duration information in the HE-SIG A. As mentioned in the foregoing description, 15 bits (e.g., B0~14) of the duration field of the MAC header may indicate the duration information and may indicate about maximum 32.7 ms (0~32767 us). If the duration information of 15 bits included in the duration field of the MAC header is transmitted in a manner of being included in the HE-SIG A as it is, an 11ax third party STA is able to properly perform NAV configuration/update. However, signaling overhead of the HE-SIG A considerably increases. Although 15 bits are considered as a relatively small size in MPDU for transmitting payload in MAC layer, since the HE-SIG A for transmitting common control information corresponds to a compactly designed field in a physical layer, if 15 bits increase in the HE-SIG A, it corresponds to relatively big signaling overhead.

Hence, embodiments of the present invention provide a method of efficiently indicating TXOP duration to minimize the overhead of the HE-SIG A. And, embodiments of the present invention provide an operation of transmitting and receiving a frame based on TXOP duration newly defined in the HE-SIG A. In the following, for clarity, a duration field included in a MAC header is referred to as MAC duration.

A value set to NAV of a 3$^{rd}$ STA can be interpreted as TXOP duration for a TXOP holder/responder. For example, in the aspect of the TXOP holder/responder, a value of the Duration field may correspond to TXOP for transmitting and receiving a frame. In the aspect of the 3$^{rd}$ STA, the value of the Duration field may correspond to NAV value. Hence, an operation of setting/updating NAV, which is set/updated by 3$^{rd}$ STAs, is to set NAV as much as TXOP for the TXOP holder/responder. In particular, for clarity, the operation of setting/updating NAV can be referred to as an operation of setting/updating TXOP. And, such a terminology as TXOP Duration can be simply referred to as Duration or TXOP. In some cases, the TXOP Duration is used to indicate a field (e.g., TXOP Duration field in HE-SIG A) in a frame or an actual TXOP Duration value.

The TXOP duration field includes 7 bits (B0~B6) in total. B0~B6 can be interpreted as follows.

If the TXOP duration field corresponds to 127 (i.e., B0~B6 are set to all 1 s), the TXOP duration field does not indicate a valid duration value. Hence, the TXOP duration field is not used for updating NAV. Since the TXOP duration value 127 does not specify duration, it can be referred to as "UNSPECIFIED".

If the TXOP duration field is not 127, B0 of the TXOP duration field indicates whether granularity of duration corresponds to 8 us or 128 us. In particular, in order to represent the duration using the bit number (i.e., 7 bits) smaller than 15 bits and MAC duration of 1 us granularity, 8 us or 128 us is used. If the B0 corresponds to 0, it may be able to represent the duration as 8 us*(value of B1~B6) us. If the B0 corresponds to 1, it may be able to represent the duration as 512+128 us*(value of B1~B6) us.

If the TXOP duration field is not filled with all 1 s (i.e., TXOP duration is not 127), the TXOP duration field may basically be set by a maximum duration value capable of being represented by 8 us or 128 us among values not exceeding MAC duration. In particular, the TXOP duration field may be set by a value closest to the MAC duration while not exceeding the MAC duration under the granularity of 8 us or 128 us.

In order not to indicate duration information for NAV configuration (i.e., no duration), an STA transmitting HE SU PPDU, HE ER SU PPDU, or HE MU PPDU may fill the TXOP duration field with all 1 s.

An STA transmitting HE SU PPDU, which carries a PS-poll frame, HE ER SU PPDU, or HE MU PPDU fills the TXOP duration field with all 1 s.

If TXOP duration of a PPDU (e.g., PPDU carrying a trigger frame) soliciting transmission is filled with all 1 s, a TXOP responder, which transmits HE trigger-based PPDU, fills a TXOP duration field of the HE trigger-based PPDU with all 1 s. On the contrary, if the TXOP duration of the PPDU soliciting the transmission is not filled with all 1 s or a format of the PPDU soliciting the transmission is not one selected from the group consisting of HE SU PPDU, HE MU PPDU, and HE ER SU PPDU, the TXOP responder, which transmits the HE trigger-based PPDU, is unable to fill the TXOP duration field of the HE trigger-based PPDU with all 1 s.

Power Save Mode of HE STA

Intra PPDU PS (power save) mode of HE AP/non-AP STA supporting transmission/reception of HE PPDU (or, 11ax PPDU) is explained in the following.

When an STA supporting HE PPDU (hereinafter, HE STA) operates in an intra PPDU PS mode, if the HE STA receives a PPDU (hereinafter, intra-PPDU) from a BSS to which the HE STA belongs thereto and the received intra-PPDU is not intended for the HE STA, it may be possible to reduce power consumption by switching the HE STA into a doze state until the end of the intra-PPDU. In this case, the HE STA may use BSS color information included in the HE-SIG A to determine whether or not a PPDU corresponds to an intra PPDU.

Specifically, (i) when a HE STA operating in the intra PPDU PS mode receives HE MU PPDU, if RXVECTOR parameter UL FLAG corresponds to 0, BSS color information of a corresponding PPDU is matched with color information of a BSS associated with the HE STA, and an identifier or a broadcast/multicast identifier of a corresponding STA is not included in RXVECTOR parameter STA_ID LIST (e.g., a list included in the HE-SIG B), the HE STA may enter the doze state until the end of the HE MU PPDU. (ii-1) When a HE STA operating in the intra PPDU PS mode receives HE MU PPDU, HE SU PPDU, or HE ER SU PPDU, if BSS color information of a corresponding PPDU is matched with color information of a BSS associated with the HE STA, UL FLAG corresponds to 0, and PHY-RXEND indication (unsupported rate) primitive is received, the HE STA may enter the doze state until the end of the corresponding PPDU. (iii) When a HE STA operating in the intra PPDU PS mode receives HE trigger-based PPDU, if BSS color of the PPDU is matched with color information of a BSS associated with the HE STA, the HE STA may enter the doze state until the end of the corresponding PPDU. (iv) When a HE STA operating in the intra PPDU PS mode receives VHT PPDU, if PAID (partial AID) of the PPDU is matched with BSSID 39 to 47$^{th}$ bit (i.e., BSSID[39:47]) of a BSS associated with the HE STA, the HE STA may enter the doze state until the end of the corresponding PPDU. (v) When a HE STA operating in the intra PPDU PS mode receives PPDU carrying A-MPDU, if TA or RA included in the A-MPDU is matched with BSSID of a BSS associated with the HE STA, is matched with BSSID of a BSS among a plurality of BSSID sets to which a BSS associated with the HE STA belongs thereto, and the RA is not a MAC address of the HE STA, the HE STA may enter the doze state until the end of the corresponding PPDU.

Although a HE STA enters the doze state, it may be necessary for the HE STA to continuously perform NAV timer(s) operation. When the HE STA is in the doze state, the HE STA considers a medium is busy and switches to an awake state at the end of a corresponding PPDU.

STAs can perform contention to access a medium immediately after a NAV timer(s) is expired.

When an STA determines to enter the doze state according to an intra PPDU PS operation, the STA may decode a part of a corresponding intra PPDU only and it may not be necessary for the STA to decode the remaining PPDU. For example, if an STA determines to enter the doze state according to an intra PPDU PS operation when decoding is performed until HE-SIG A field, the STA may enter the doze state until the end of the PPDU without decoding other fields (e.g., HE-SIG A, PSDU/MPDU, etc.) appearing after the HE-SIG A field.

Meanwhile, according to 11ax system, HE STA (e.g., non-AP STA or AP STA) may be able to maintain 2 NAV timers. In case of performing virtual carrier sensing (CS), if both timers correspond to 0, the HE STA determines it as a medium is idle. In particular, if one of the NAV timers shows a value which is not 0, the medium is determined as busy.

The 2 NAVs can include intra-BSS NAV and basic NAV. The basic NAV can be referred to as a regular NAV, an OBSS NAV, or an inter-BSS NAV. When a $3^{rd}$ party STA intends to update NAV via an intra BSS PPDU (i.e., PPDU received from a BSS identical to a BSS to which the $3^{rd}$ party STA belongs), the $3^{rd}$ party STA updates the intra-BSS NAV. In this case, the update includes not only update for increasing NAV value but also update for initial configuration or reset of NAV.

If the $3^{rd}$ party STA receives a PPDU incapable of being determined as OBSS (overlapping BSS) PPDU or intra-BSS PPDU, the $3^{rd}$ party STA updates the basic NAV.

In order to determine whether or not a PPDU corresponds to the intra-BSS PPDU, it may use BSS color information of the PPDU.

When both TXOP duration of HE-SIG A and duration of MAC header are obtained, the duration of the MAC header is used for updating NAV because the duration of the MAC header is more accurate. In particular, this can be comprehended as the MAC duration has priority higher than that of the TXOP duration of the HE-SIG A. Meanwhile, if the TXOP duration corresponds to all 1 s, the NAV update is not performed by a value of 127.

Transmission/Reception of HE PPDU Carrying RTS/CTS Frame

As mentioned in the foregoing description, when HE STA receives intra-PPDU, the HE STA can reduce power consumption by entering doze state during PPDU duration.

If it is able to transmit an RTS frame or a CTS frame via HE SU PPDU or HE extended range (ER) SU PPDU and the HE SU PPDU/ER SU PPDU satisfies the aforementioned intra-PPDU PS condition, HE STA corresponding to a $3^{rd}$ party STA may enter the doze state until the end of the HE SU PPDU/ER SU PPDU.

In particular, if the $3^{rd}$ party HE STA, which has received the HE PPDU including the RTS frame, updates NAV based on a TXOP duration field and enters the doze state, the $3^{rd}$ party HE STA is unable to update NAV based on MAC duration of RTS.

When a TXOP holder STA transmits RTS, if the TXOP holder STA does not receive a CTS response from a TXOP responder STA, the TXOP holder STA does not transmit a data frame. In particular, if there is no CTS response, a $3^{rd}$ party STA not entering the doze state resets NAV which is set via the RTS. If the $3^{rd}$ party STA enters the doze state by the RTS frame transmitted to a HE PPDU, it is unable to properly perform NAV reset.

In the following, methods for solving the aforementioned problem are explained.

According to one embodiment of the present invention, when HE STA transmits an RTS/CTS frame to HE SU PPDU, HE MU PPDU, or HE ER SU PPDU, the HE STA is able to set a TXOP duration field of HE PPDU to all 1 s.

In this case, the HE STA (e.g., $3^{rd}$ party) operating in intra-PPDU power saving mode does not enter the doze state after receiving HE SU PPDU, HE MU PPDU, or HE ER PPDU in which the TXOP duration field is set to all 1 s, UL flag is set to 1, and BSS color is set to a value identical to BSS color of an AP associated with HE STA.

In other word, when the HE STA operating in the intra-PPDU power saving mode receives the HE SU PPDU or the HE ER SU PPDU, if the UL flag is set to 1 and the TXOP duration field is not set to all 1 s, the HE STA may enter the doze state of the intra-PPDU power saving mode.

Figure 20:
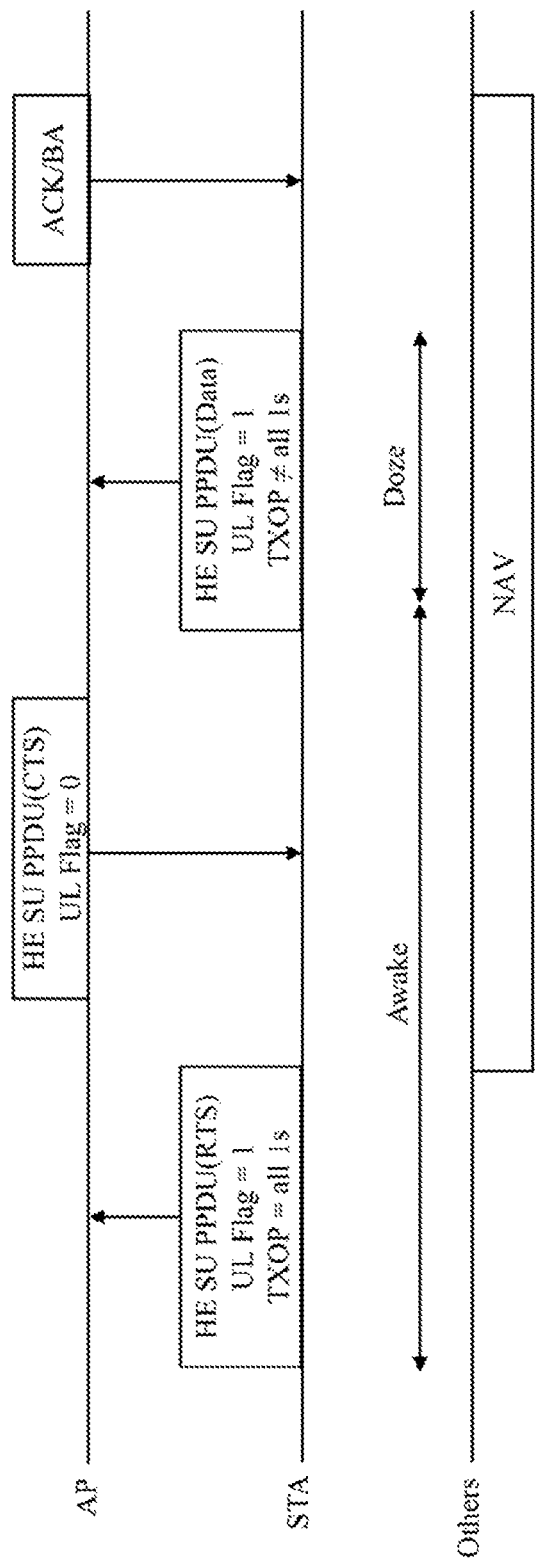
FIG. 20 illustrates a method of transmitting and receiving an RTS/CTS frame according to one embodiment of the present invention.

FIG. 20 illustrates a method of transmitting and receiving an RTS/CTS frame according to one embodiment of the present invention.

For clarity, FIG. 20 shows an example that HE SU PPDU carries an RTS/CTS frame, by which embodiments of the present invention may be non-limited. It may be possible to use a HE PPDU of a different format (e.g., HE ER SU PPDU or HE MU PPDU). Assume that an AP, an STA, and a $3^{rd}$ party STA belong to the same BSS.

When an STA intends to transmit an RTS frame, the STA sets a UL flag to a value corresponding to UL (e.g., 1) and sets a TXOP duration value to all 1 s (e.g., 127). The STA transmits the RTS frame to an AP via the HE SU PPDU. The RTS frame is transmitted as a payload of the HE SU PPDU (i.e., PSDU (or MPDU)).

Since the HE SU PPDU, which is transmitted to the AP by the STA, includes an address of the AP as a receiver address, the HE SU PPDU can be referred to as 'addressed to AP'.

Meanwhile, the HE SU PPDU transmitted by the STA can be detected by a $3^{rd}$ party STA (others in FIG. 20). Since the TXOP duration value of the received HE-SIG A is set to all 1 s, the $3^{rd}$ party STA does not enter the doze state of the intra-PPDU PS mode. In particular, since the TXOP duration value of the received HE-SIG A is set to all 1 s, the $3^{rd}$ party STA maintains an awake state. And, since the TXOP duration value of the received HE-SIG A is set to all 1 s, the $3^{rd}$ party STA does not use the TXOP duration of the HE-SIG A for updating the NAV. For example, after the HE-SIG A field is decoded, the $3^{rd}$ party STA not entering the doze state continuously performs decoding on MAC header to obtain MAC duration. The $3^{rd}$ party STA can set or update the NAV based on the MAC duration of the RTS frame included in PPDU payload.

The AP transmits a CTS frame via the HE SU PPDU in response to the received RTS frame. In this case, UL flag is set by a value (e.g., 0) corresponding to DL.

Having received the CTS frame, the STA transmits data to the AP via the HE SU PPDU. In this case, UL flag is set by a value corresponding to UL and the TXOP duration is set by a value rather than 127.

The $3^{rd}$ party STA maintaining the awake state receives the HE SU PPDU that carries data. The $3^{rd}$ party STA decodes the HE-SIG A of the HE SU PPSU, checks that UL flag is set to 1 and the TXOP duration is not set to all 1 s. The $3^{rd}$ party STA enters the doze state until the end of the HE SU PPDU.

Having received the data, the AP transmits ACK or BA frame to the STA.

Figure 21:
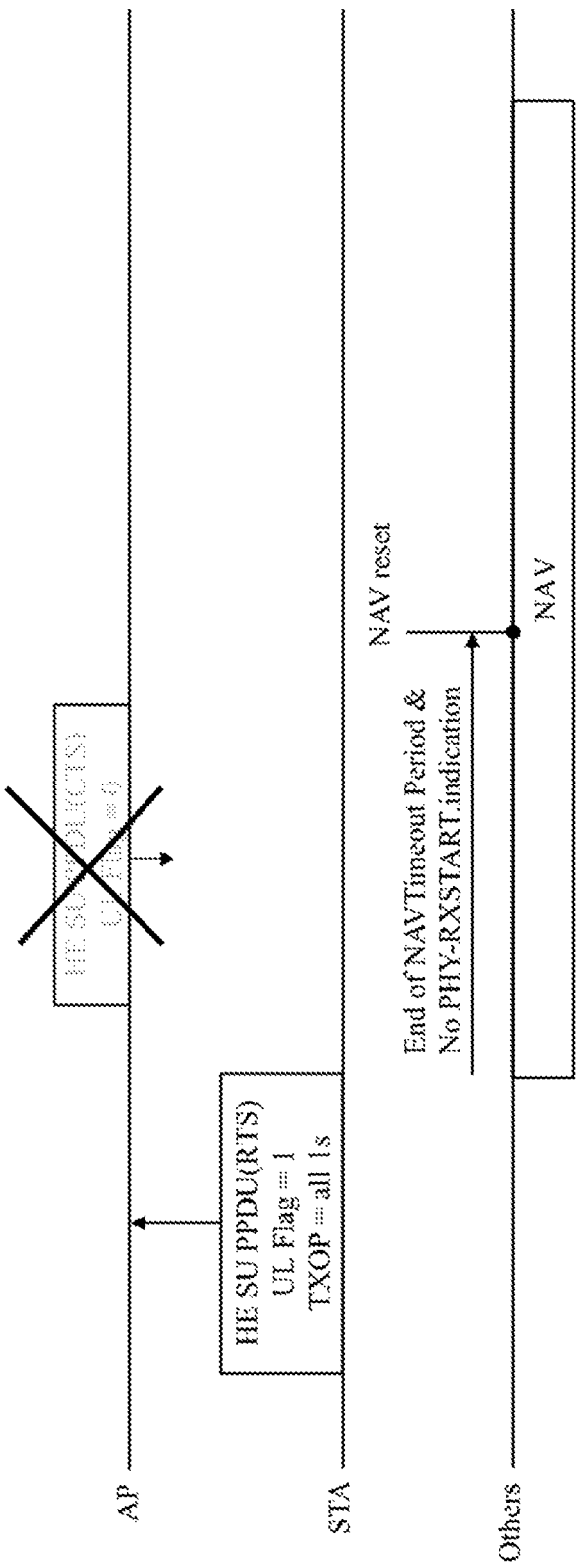
FIG. 21 illustrates a method of transmitting and receiving an RTS/CTS frame according to a different embodiment of the present invention.

FIG. 21 illustrates a method of transmitting and receiving an RTS/CTS frame according to a different embodiment of the present invention. Explanation on content overlapped with the aforementioned content is omitted.

In FIG. 21, a point different from FIG. 20 is mainly explained. Referring to FIG. 21, a $3^{rd}$ party STA is unable to receive a CTS frame transmitted by an AP. For example, the AP may not transmit HE SU PPDU carrying the CTS frame. Or, although the AP transmits the HE SU PPDU carrying the CTS frame, the $3^{rd}$ party STA may fail to detect the HE SU PPDU.

Having received the HE SU PPDU including an RTS frame, the $3^{rd}$ party STA sets/updates NAV. If the $3^{rd}$ party STA does not receive PHY-RXSTART.indication until NAV-Timeout period, the $3^{rd}$ party STA resets NAV of the $3^{rd}$ party STA. In particular, since a CTS frame is not detected, the PHY-RXSTART.indication indicating that reception starts in a physical layer is not issued.

Figure 22:
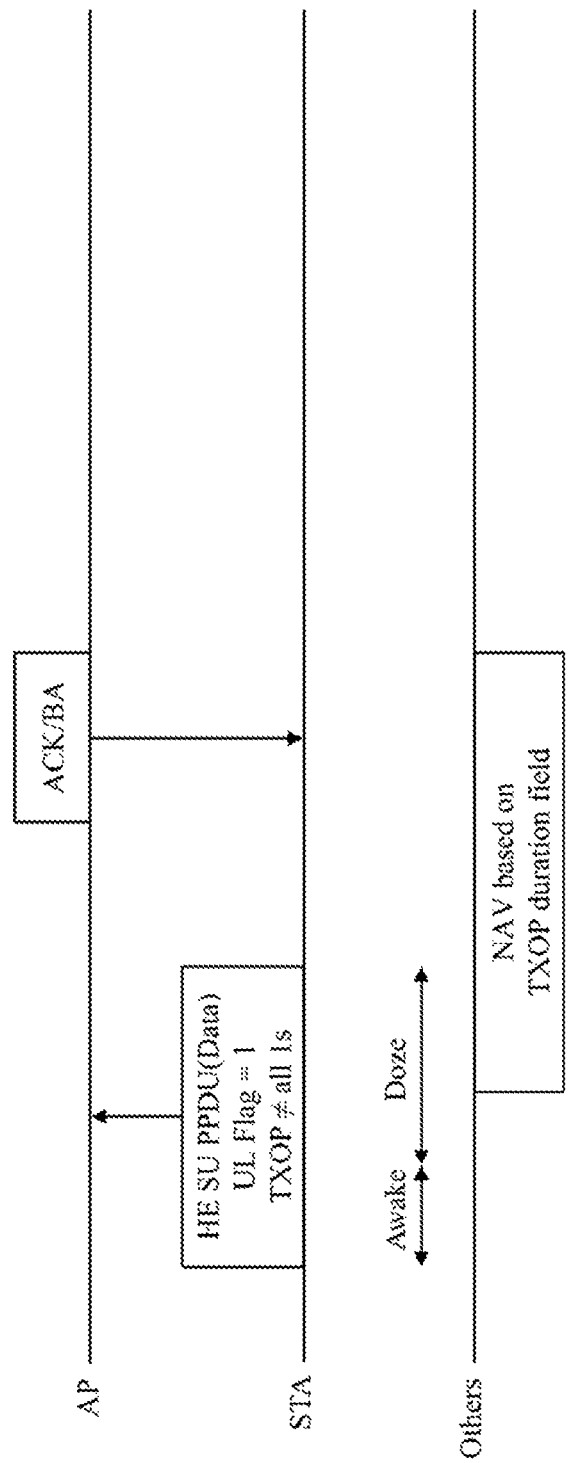
FIG. 22 illustrates a method of transmitting and receiving a data frame according to one embodiment of the present invention.

FIG. 22 illustrates a method of transmitting and receiving a data frame according to one embodiment of the present invention. Explanation on content overlapped with the aforementioned content is omitted.

Referring to FIG. 22, an STA transmits a data frame to an AP via HE SU PPDU. UL flag is set by a value corresponding to UL and TXOP duration is set by a value rather than 127.

Since a $3^{rd}$ party STA has received the HE SU PPDU that the UL flag corresponds to 1 and the TXOP duration field is set by a value rather than 127, the $3^{rd}$ party STA updates the NAV based on the TXOP duration field and enters the doze state until the end of the HE SU PPDU duration.

For example, in order for a HE non-AP STA operating in an intra-PPDU PS mode to enter the doze state until the end of a currently received PPDU, it may be necessary to satisfy the following conditions. The PPDU corresponds to HE MU PPDU, HE SU PPDU, or HE ER SU PPDU, RXVECTOR parameter BSS_COLOR is matched with BSS color information of a BSS associated with the HE non-AP STA, RXVECTOR parameter TXOP_DURATION is not set to all 1 s, and the RXVECTOR parameter UL_FLAG corresponds to 1.

When an STA transmits HE SU PPDU, HE ER PPDU, or HE MU PPDU carrying an RTS frame or a CTS frame, it may be necessary for the STA to set the TXVECTOR parameter TXOP DURATION to all 1 s.

The STA transmitting/receiving an RTS/CTS frame can prevent the $3^{rd}$ party STA operating in the intra PPDU PS mode from entering the doze state using the aforementioned methods.

Figure 23:
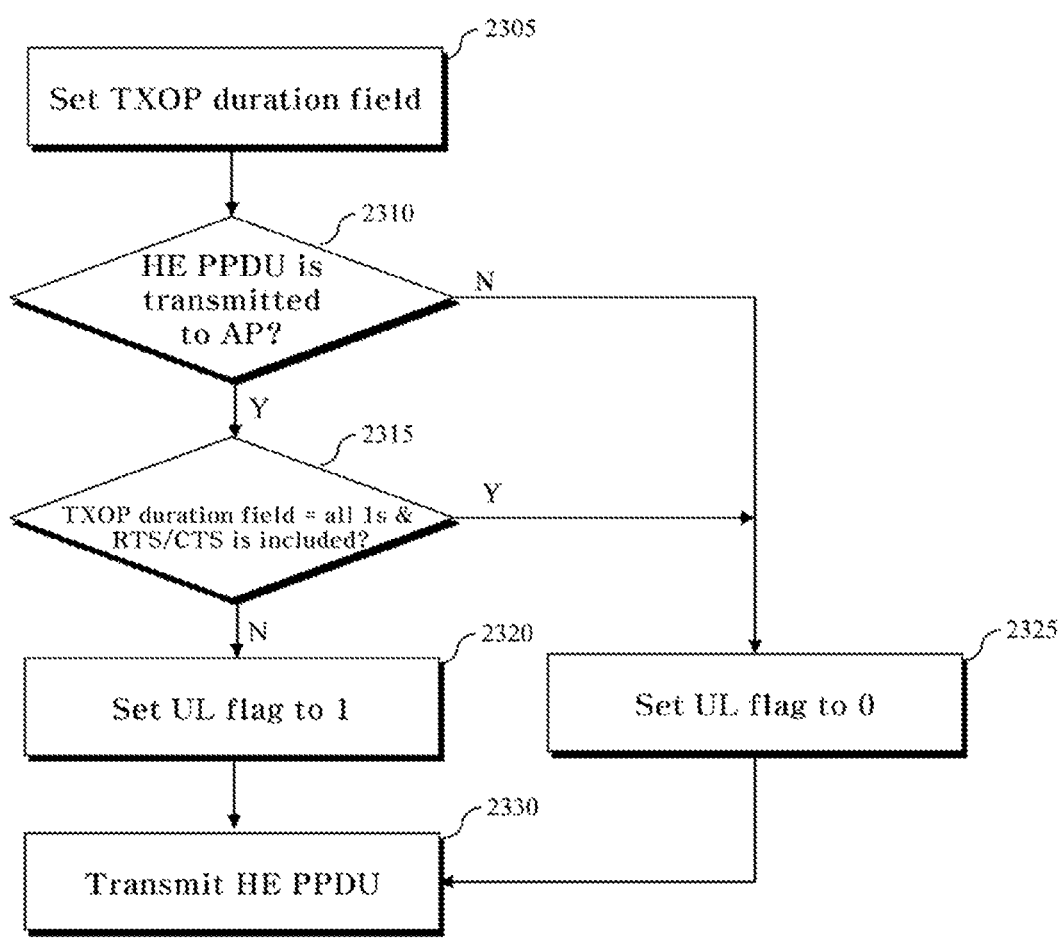
FIG. 23 is a flowchart for a method of transmitting and receiving an RTS/CTS frame according to a further different embodiment of the present invention.

FIG. 23 is a flowchart for a method of transmitting and receiving an RTS/CTS frame according to a further different embodiment of the present invention. Explanation on content overlapped with the aforementioned content is omitted.

According to the present example, it is possible to prevent a $3^{rd}$ party STA operating in an intra PPDU PS mode from entering doze state using a UL flag.

For example, when HE STA transmits HE ER SU PPDU including an RTS frame or a CTS frame, the HE STA can set TXOP duration field of the PPDU to all 1 s. When the HE ER SU PPDU including the RTS frame or the CTS frame is transmitted, if the TXOP duration field of the PPDU is set to all 1 s, the HE STA sets a UL flag to 0 corresponding to DL.

In other words, when an STA transmits HE PPDU to an AP, the STA sets UL flag to 1, except for a case in which the HE PPDU is HE ER SU PPDU including a TXOP duration field set to all 1 s and including an RTS frame or a CTS frame, in this case the STA exceptionally sets the UL flag to 0 (A STA transmitting an HE PPDU that is addressed to an AP shall set the TXVECTOR parameter UPLINK_FLAG to 1, except when the HE PPDU is an HE extended range SU PPDU with the TXOP Duration field set to all 1 s and contains an RTS or CTS frame in which case the STA may set the TXVECTOR parameter UPLINK_FLAG to 0).

Meanwhile, even though the HE ER SU PPDU includes the RTS/CTS frame, if the TXOP duration field is not set to all 1 s (i.e., valid duration information), the $3^{rd}$ party STA may set NAV using the TXOP duration field. Thus, there's no problem with setting NAV in this case where the TXOP duration field indicates valid duration information, even if the $3^{rd}$ party STA enters the doze state of intra-PPDU PS. In other words, there's no problem with TXOP protection even if the 3rd party STA enters the doze state. Because, the 3rd party STA will defer channel access until the NAV timer expires after getting back to the awake state from the doze state.

Yet, if the TXOP duration field is set to all 1 s (i.e., no valid duration information) and the $3^{rd}$ party STA enters the doze state of the intra-PPDU PS, then the $3^{rd}$ party STA is unable to read MAC address, and thus the $3^{rd}$ party STA is unable to set NAV. For example, if the 3rd party STA entered the doze state without proper NAV setting, the third STA may attempt to access medium right after getting back to the awake state from the doze state (e.g., DCF or EDCA based channel access). Hence, in this case where the TXOP duration field is set to all 1 s, it may be preferable to set the UL flag to 0 to prevent the $3^{rd}$ party STA from entering the doze state of the intra-PPDU PS.

Setting the TXOP duration field to all 1 s is not restricted to RTS/CTS frame transmission. For example, if BSS color of OBSS is collided with BSS color information, it may be able to set the TXOP duration field to all 1 s.

Meanwhile, the RTS/CTS frame is transmitted via HE SU ER PPDU format in general rather than HE SU PPDU format. This is because, since the RTS/CTS frame is a MAC control frame, it may be preferable to transmit the RTS/CTS frame in legacy format rather than HE PPDU format such that a legacy $3^{rd}$ party STA is able to listen to the RTS/CTS frame. Hence, it may be preferable to transmit the RTS/CTS frame using non-HT or non-HT duplicate PPDU.

Yet, coverage may vary depending on a PPDU format. Under limited Tx power, as a bandwidth is getting wider, coverage is getting relatively smaller. Hence, coverage is getting wider in an order of non-HT duplicate<non-HT<HE ER SU PPDU in general transmission environment. As a result, for an Rx STA located at far, it may consider a case of exchanging the RTS/CTS frame via the HE ER SU PPDU. In particular, a Tx STA transmits the RTS/CTS using the non-HT or non-HT duplicate PPDU format for a short distance Rx STA and transmits the RTS/CTS using the HE ER SU PPDU format for a long distance Rx STA. Hence, it is unusual to transmit the RTS/CTS using the HE SU PPDU format.

However, transmitting the RTS/CTS frame itself using the HE SU PPDU format is not prohibited. Yet, it may not regulate an exception of UL flag configuration for the unusual case of transmitting the RTS/CTS using the HE SU PPDU format. For example, when an STA transmits RTS or CTS to an AP via the HE SU PPDU, although the TXOP duration field is set to all 1 s, the UL flag can be set to 1.

On the contrary, according to a different embodiment of the present invention, the HE SU PPDU and the HE ER SU PPDU are handled in the same way. For example, when an STA transmits RTS or CTS to an AP via the HE SU PPDU, if the TXOP duration field is set to all 1 s, the UL flag can be set to 0.

Referring back to FIG. 23, assume that an STA corresponds to a HE non-AP STA or a HE AP STA transmitting an RTS or a CTS frame.

First of all, the STA sets TXVECTOR parameter TXOP duration [2305]. For example, if HE PPDU carries an RTS frame or a CTS frame, the STA can set each bit of the TXOP duration field to all 1 s. Or, when PPDU received by the STA solicits transmission of the HE PPDU, if each bit of the TXOP duration field included in the received PPDU is set to all 1 s, the STA is able to set each bit of the TXOP duration field of the HE PPDU to all 1 s. For clarity, assume that each bit (7 bits in total) of the TXOP duration field is set to all 1 s (i.e., 127).

The STA sets TXVECTOR parameter UL flag [2310, 2315, 2320, and 2325].

The STA transmits high efficiency physical layer protocol data unit (HE PPDU) including the TXOP duration field and the UL flag [2330].

If the HE PPDU is transmitted to an AP [2310], the STA sets the UL flag to a first value (e.g., UL flag=1) corresponding to UL [2320]. When the HE PPDU is addressed to the AP, it is considered that the HE PPDU is transmitted to the AP. If the HE PPDU indicates the address of the AP as a recipient, it can be considered that the HE PPDU is addressed to the AP. For example, when the RA field included in the HE PPDU is set to an address (e.g., MAC address or BSSID, etc.) of a specific STA (e.g., AP STA/non-AP STA), the corresponding HE PPDU is addressed to the specific STA, but not limited thereto.

Yet, if the TXOP duration field is set to a special value rather than a TXOP duration value for setting network allocation vector (NAV) and the HE PPDU corresponds to a single user (SU) PPDU carrying an ready-to-send (RTS) frame or a clear-to-send (CTS) frame, although the HE PPDU is transmitted to the AP, the STA can set the UL flag to a second value (e.g., UL flag=0) corresponding to DL [2310. 2315, 2325]. The special value may correspond to a value (e.g., 127 or UNSPECIFIED) for setting each bit of the TXOP duration field to all 1 s.

For example, if the SU PPDU carrying the RTS frame or the CTS frame corresponds to HE extended range (ER) SU PPDU, the STA can set the UL flag to a second value corresponding to DL. The HE ER SU PPDU may correspond to SU PPDU that HE-SIG A is repeated. The TXOP duration field and the UL flag are located at the HE-SIG A field.

If the STA sets the UL flag of the HE PPDU transmitted to the AP to the second value, a 3$^{rd}$ party STA operating in an intra-PPDU power saving mode may not enter a doze state until the end of the HE PPDU.

Meanwhile, if the SU PPDU carrying the RTS frame or the CTS frame is not the HE ER SU PPDU, the STA is able to set the UL flag to the first value corresponding to UL.

Figure 24:
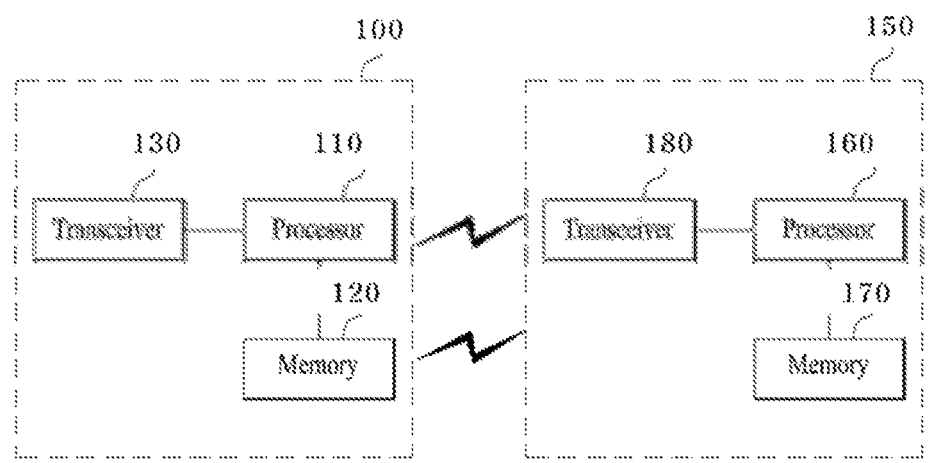
FIG. 24 is a diagram for explaining a device according to one embodiment of the present invention.

FIG. 24 illustrates devices for implementing the aforementioned methods.

A wireless device 100 and a wireless device 150 in FIG. 24 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11 wireless LAN systems.

What is claimed is:

1. A method of transmitting a frame by a station (STA) in a wireless local area network (WLAN) system, the method comprising:
   setting a transmission opportunity (TXOP) duration field and a uplink (UL) flag; and
   transmitting a high efficiency physical layer protocol data unit (HE PPDU) containing the TXOP duration field and the UL flag,
   wherein the STA sets the UL flag to a first value corresponding to uplink if the HE PPDU is addressed to an access point (AP) and
   wherein, when the TXOP duration field is set to a predetermined value other than a TXOP duration value for setting a network allocation vector (NAV) and the HE PPDU corresponds to a single user (SU) PPDU carrying a ready-to-send (RTS) frame or a clear-to-send (CTS) frame, the STA sets the UL flag to a second value corresponding to downlink even if the HE PPDU is addressed to the AP.

2. The method according to claim 1, wherein the STA sets the UL flag to the second value when the SU PPDU carrying the RTS frame or the CTS frame corresponds to a HE extended range (ER) SU PPDU.

3. The method according to claim 2, wherein the HE ER SU PPDU is a SU PPDU in which a HE-SIG A field including the TXOP duration field and the UL flag is repeated more than one time.

4. The method according to claim 2, wherein the STA sets the UL flag to the first value when the SU PPDU carrying the RTS frame or the CTS frame is not the HE ER SU PPDU.

5. The method according to claim 1, wherein the predetermined value corresponds to a value for setting all bits of the TXOP duration field to 1 s.

6. The method according to claim 5, wherein the STA sets all bits of the TXOP duration field to 1 s when the HE PPDU carries the RTS frame or the CTS frame.

7. The method according to claim 5, wherein the STA sets all bits of the TXOP duration field of the HE PPDU to 1 s when a PPDU received by the STA solicits for transmission of the HE PPDU, and all bits of a TXOP duration field of the received PPDU are set to 1 s.

8. The method according to claim 1, wherein a third party STA operating in an intra-PPDU power saving mode does not enter a doze state until an end of the HE PPDU when the STA sets the UL flag of the HE PPDU addressed to the AP to the second value.

9. A station (STA) for transmitting a frame in a wireless local area network (WLAN) system, comprising:
- a processor configured to set a transmission opportunity (TXOP) duration field and a uplink (UL) flag; and
- a transmitter configured to transmit a high efficiency physical layer protocol data unit (HE PPDU) containing the TXOP duration field and the UL flag under control of the processor,
- wherein the processor is configured to set the UL flag to a first value corresponding to uplink if the HE PPDU is addressed to an access point (AP) and
- wherein, when the TXOP duration field is set to a predetermined value other than a TXOP duration value for setting a network allocation vector (NAV) and the HE PPDU corresponds to a single user (SU) PPDU carrying an ready-to-send (RTS) frame or a clear-to-send (CTS) frame, the processor is configured to set the UL flag to a second value corresponding to downlink even if the HE PPDU is addressed to the AP.

10. The STA according to claim 9, wherein the processor is configured to set the UL flag to the second value when the SU PPDU carrying the RTS frame or the CTS frame corresponds to a HE extended range (ER) SU PPDU.

11. The STA according to claim 10, wherein the HE ER SU PPDU is an SU PPDU in which a HE-SIG A field including the TXOP duration field and the UL flag is repeated more than one time.

12. The STA according to claim 10, wherein the processor is configured to set the UL flag to the first value when the SU PPDU carrying the RTS frame or the CTS frame is not the HE ER SU PPDU.

13. The STA according to claim 9, wherein the predetermined value corresponds to a value for setting all bits of the TXOP duration field to 1 s.

14. The STA according to claim 13, wherein the processor is configured to set all bits of the TXOP duration field to 1 s when the HE PPDU carries the RTS frame or the CTS frame.

15. The STA according to claim 13, wherein the STA sets all bits of the TXOP duration field of the HE PPDU to 1 s when a PPDU received by the STA solicits for transmission of the HE PPDU and all bits of a TXOP duration field of the received PPDU are set to 1 s.

* * * * *